United States Patent [19]

Latty

[11] 4,125,462

[45] Nov. 14, 1978

[54] COATED MEMBRANES

[75] Inventor: James Latty, Seal Beach, Calif.

[73] Assignee: Rohm and Haas Company, Philadelphia, Pa.

[21] Appl. No.: 829,040

[22] Filed: Aug. 30, 1977

[51] Int. Cl.² ............................................ B01D 13/00
[52] U.S. Cl. .................................. 210/23 F; 210/75; 210/193; 210/321 R; 210/500 M
[58] Field of Search ............... 210/490, 321 B, 321 R, 210/321 A, 500 M, 22, 75, 193, 2.1 E, 2.2 R; 417/214, 216

[56] References Cited

U.S. PATENT DOCUMENTS

| | | | |
|---|---|---|---|
| 3,228,876 | 1/1966 | Mahon | 210/321 B X |
| 3,331,772 | 7/1967 | Brownscumbe et al. | 210/22 X |
| 3,462,362 | 8/1969 | Kollsman | 210/321 R X |
| 3,556,305 | 1/1971 | Shorr | 210/490 |
| 3,615,024 | 10/1971 | Michaels | 210/490 |
| 4,035,459 | 7/1977 | Kesting | 210/500 R X |

Primary Examiner—Frank A. Spear, Jr.
Attorney, Agent, or Firm—Alvin M. Esterlitz

[57] ABSTRACT

Novel membranes having one coating or layer of a cationic polyelectrolyte, the method of preparation, and use for rejecting ionically charged solutes.

16 Claims, No Drawings

COATED MEMBRANES

The present invention relates to a novel coated membrane having one layer or coating of a cationic polyelectrolyte which may be of various thicknesses and methods of preparing and using the same. In a preferred embodiment, the membranes have a single layer or coating of a plus or cationic charged polyelectrolyte which preferably is poly(vinylimidazoline) in the bisulfate form (hereinafter termed "PVI" for ease of reference) and which is useful in the deionization of aqueous streams as well as for many other applications.

The molecular weight (MW) cutoff of a membrane is the minimum molecular weight for material which will be rejected and not pass through the membrane. Although low molecular weight cutoff membranes can be produced, e.g., flat sheet membranes, they are generally deficient in their low capacity or flux rates. In the case of polymeric hollow fiber (ultrafiltration) UF membranes, operating pressures approaching the burst pressure of the membrane have been required in the past to obtain reasonable capacity with low MW cutoff. Reverse osmosis, generally used for separation of smaller molecules, has the disadvantage of requiring relatively high pressures for separation.

The deionization and ion rejection of liquids, especially water, has been extensively studied using reverse osmosis (herein alternatively RO), sometimes referred to a hyperfiltration (HF), electrodialysis (ED), ultrafiltration (UF), and other techniques employing membranes. The types of membranes used have included both inorganic and organic polymeric materials, ceramics, glass frits, porous metals, graphite, and the like. A principal technique involves using a very "tight" membrane with openings (pores) sufficiently small to reject a portion of the larger ions and molecules. Another important method, and the one most relevent to the present invention, uses "charged", preferably highly positively (+) charged, membranes to repel ions and thereby prevent their passage through the membrane pores. As is extensively reported in the literature heretofore, electrodialysis and reverse osmosis are considered generally to be less than ideal for deionization due to the necessary process costs incurred in maintaining high current densities and high pressure, respectively, as well as the relatively expensive membranes required to withstand the extreme process conditions of these methods.

Ultrafiltration (UF) membranes, such as the modern hollow fiber membranes, have the capability of high permeation rates (flux) by virtue of their large surface areas in a relatively small volume, and other factors, but are not generally useful for separation of small molecules, that is, those having molecular weights below about 1,000. The low operating pressures of UF membranes (up to 150 psi) and the high shear forces existing at the surface, which minimizes concentration polarization by rejected solutes, make UF highly desirable for concentrating or fractionating industrial streams where it is desirable to separate one or more molecules from solvent and/or molecular species of significantly smaller sizes and weights. Although UF hollow fiber membranes have been extensively used heretofore for fractionating industrial streams (e.g., the recovery of protein from cheese whey), removal of colloidal and suspended matter from aqueous and non-aqueous streams, electrocoating paint applications, and cold sterilization, the scope of additional applications has been somewhat inhibited by an inability to economically furnish UF membranes with controlled pore sizes needed to reject smaller molecular species and also having good capacity.

Desalination of water using hyperfiltration (or RO) with dynamic membranes having very small pores has been taught in the prior art (see U.K. Patent Specification No. 1,135,511, published Dec. 4, 1968). This process suffers largely from the need for very high pressures (e.g., 350-3000 psi) and the fugitive nature of the dynamic membrane under such extreme pressures. Although the use of polyelectrolytes as membrane components is taught, the inherent nature of the dynamic membrane would seem to preclude use of discrete layers or coatings of positively charged polyelectrolytes.

Ion rejection with RO membranes having thin films of polyelectrolyte polymers cast or dip-coated onto a porous support has been studied and reported upon extensively in the literature. Such membranes, sometimes termed "composite membranes" are expensive to prepare and use but yield relatively good salt rejection (see, e.g., Sachs, S. B. and Lonsdale, H. K., *Preparation and Properties of Poly(acrylic acid) Composite Membranes*, Journal of Applied Polymer Science, Vol. 15, pages 797-809 (1971)). (Also, see Scala, L. C., et al., U.S. Pat. No. 3,744,642). Another variation of composite membranes involves formation of a relatively thick charged membrane, e.g., having a thickness of less than about 50 Å by an in situ reaction on the surface of a porous membrane substrate, e.g., a cellulose acetate substrate (see, Lonsdale, H. K., et al., *Research and Development Progress Report No. 484*, U.S. Department of the Interior, Office of Saline Water (1969). The composite membranes have shown a decided tendency to foul, particularly poly(acrylic acid) on a polysulfone membrane substrate, when tested under reverse osmosis methods. Further, most of the polyelectrolyte deposited upon a substrate by this technique is rapidly dissolved on exposure to water, leaving only a very thin layer on the substrate surface (Sachs, S. B., supra).

Gels, polymers, and/or single polyelectrolytes have been "coated" on the surface of membrane substrates to improve pressure-rejection characteristics, salt rejection, and the like with various types of RO and UF membranes (see, e.g., Massucco, A. A., U.S. Pat. No. 3,556,992; Shorr, J., U.S. Pat. No. 3,566,305). Single layers of polyelectrolytes have been attached to a membrane substrate using an adhesive polymer to hold polyelectrolyte and substrate together (Shorr, J., supra). Perhaps the most outstanding attribute of these "coated" membranes is the limited amounts of materials needed to improve ion rejection characteristics and their ease of application. However, while heretofore single layer "coatings" have been applied to membrane substrates for ion rejection in a large measure, these have been deficient due to their lack of efficacy and/or durability in process applications.

The advantage of forming a membrane with both cationic and anionic charges to reject ions is taught in the more recent patents to Gregor (U.S. Pat. No. 3,808,305 issued Apr. 30, 1974 and U.S. Published Application B433,930 issued Mar. 23, 1976). Both high reflux rate and low pressures are among the outstanding features claimed by Gregor for his bipolar membranes. The method for producing thise bipolar membranes involves preparation of uniformly charged membranes optionally "sandwiched" together with oppositely charged membranes touching or separated by a neutral, i.e., nonionic, membrane layer. Since the charged membrane layers of the "sandwich" are produced by dispersing or dissolving a polyelectrolyte in a polymer matrix, eventually crosslinked, the polyelectrolyte is obviously located throughout the entire membrane, not merely as a concentrated charged barrier at the surface of the membrane, and by virtue of being rigidly fixed into the polymer backbone is subject to being blocked substantially from interfacing with the charged matter in the in-process fluids. Relatively large amounts of polyelectrolytes are used in the crosslinked membranes (typically 10% to 80% by weight of the membrane), thus substantially affecting membrane cost, composition, character and/or strength.

Notwithstanding the intrinsic disadvantages of the economics, composition and physical structure of the prior art "sandwiched" bipolar membranes, the idea of rejecting charged materials fixed into the membrane appears to offer many advantages. It has been demonstrated, (for example, by Gregor, U.S. Pat. No. 3,808,305) that salts, dyes and proteins are substantially, if not completely, separated from a host aqueous medium using charged membranes and low pressures (e.g., between 60 and 100 psi). Accordingly, the prior art techniques of deioniazation and/or ion rejection show promose for furnishing an attractive means of separating materials, but clearly have many detracting features which need to be overcome to maximize their practicality and performance.

This invention offers novel membranes and techniques capable of performing ion-rejection of liquids with at least the same overall performance of the prior art materials but in a simpler, more economical and practical manner and with much higher flux rates. Thus, the invention involves a substantialy technical advance in the field of ion-rejection.

By the present invention, there are furnished membranes having a single coating or layer of a polyelectrolyte which polyelectrolyte is affixed to semipermeable membranes as "coatings". The polyelectrolyte coating is usually extremely thin and is commonly deposited on the surface of the membrane in direct contact with the process solution. Alternatively, the opposite sides of a thin membrane film may be coated with the same or different polyelectrolyte. In a preferred embodiment of the invention, the polyelectrolyte is located on the surface of the membrane in contact with the process fluid.

The membranes which are to be coated, i.e., serve as the substrate for the coated membranes of the invention, need not in any way differ from ordinary semipermeable membranes used heretofore for UF, RO, ED or other filtration processes. Accordingly, it is a principal advantage of the invention that membranes prepared by known methods and having a composition which is known to yield optimum strength, durability and/or permeation characteristics, etc. can be produced to conform with such desideratum and thereafter easily converted to ion rejection membranes by the present invention without loss of their desired physical properties.

The polyelectrolyte "coatings" or "layers" of the invention are extremely thin relatively uniform coatings deposited on one or more surfaces of the membranes from a solution or fine dispersion of the coating material, normally an aqueous solution. The method of application requires that the solution be passed over the membrane surface to be coated for an extended period, e.g., normally at least about 15 minutes until effective amounts of material deposit on the membrane. When deposited in this manner, especially in accordance with the preferred method of application as explained hereinafter, the polyelectrolyte forms substantive coatings on all types of membrane materials capable of enduring long periods of operation and even backflushing of permeate, used in hollow fiber UF operations to clean fouled membrane surfaces.

Microscopic observations of the coating of this invention on membrane substrates indicate that the coating, while relatively uniform over the entire membrane surface, is not necessarily a continuous film-like layer as are the membranes deposited on a porous substrate to form the "composite membranes" of the prior art. Rather, this coating or layer usually exhibits domains of relatively high and low concentration of polyelectrolyte, in what may be termed a variegated effect. A top view of a coated membrane showed microscopic hills and valleys of polyelectrolyte coating formed on the original smooth skin of the membrane.

Although no theory is relied upon for the operability of the invention, which has been exhaustively demonstrated by practical examples some of which are presented below, it appears that the thin coating of the cationic polyelectrolyte rejects ions very effectively due to the concentration of high charge in the proximity of the membrane surface. The same has been found to occur when one cationic polyelectrolyte is coated on the permeate side of the membrane. Ostensibly, the polyelectrolyte on the permeate side has sufficient charge strength, and is located such as to repel ions attempting to permeate the membrane. It must be concluded therefore for ion rejection that the amount of cationic polyelectrolyte is relatively minor in importance to its location and possibly the uniformity of its distribution along the membrane surface. Therefore, for any given amount of polyelectrolyte, more effective ion rejection is obtained by the membranes of the invention when compared to the prior art membranes.

The preferred membrane substrates for the invention are the organic polymeric membranes commonly used in low pressure (150 psi and lower) ultrafiltration processes, especially the hollow fiber membranes, including linear thin channel (LTC) membranes, and those used for moderate pressure (up to about 300–400 psi) reverse osmosis processes, including flat sheet membranes used in LTC modules. Such membranes are produced from a variety of polymers such as polyimide, polysulfone, styreneacrylonitrile, copolymers of polyvinylchloride with acrylonitrile, cellulose acetate, polycarbonates, polyvinyl chloride, copolymers of polyvinyl chloride with a modacrylic polymer, cellulose acetate, polyamide/imide, aliphatic and aromatic nylons, polyamides, polyacrylonitrile, polyphenyleneoxide, etc. In a particularly preferred aspect, the invention is useful in ultrafiltration employing thin channel membranes, such as hollow fiber spiral wound, LTC and various modification thereof. Anisotropic hollow fiber membranes (commercially available from Romicon, Inc., Woburn, Mass.) having single coherent structures which can withstand pressures on either side of the active membrane surface (skin) without rupture, are a preferred class of starting materials. Anisotropic hollow fibers are broadly taught in U.S. Pat. No. 3,615,024 dated Oct. 26, 1971 to A. S. Michaels. The anisotropic hollow fiber UF membranes are designed to allow relatively "dirty" industrial streams to flow through the lumen (or inside channel) of the fiber with minimum prefiltration. This fiber has a very tight thin skin on the inside surface supported by a sponge-like outer structure which adds substantial support to the fiber and, because of this integral structure, fouling can be removed by flowing a fluid in the reverse direction from the outside of the fiber to the inside without delaminating the membrane skin from the support structure. This membrane cleaning technique is called "backflushing". The polyelectrolyte coating is capable of withstanding repeated backflushing cycles without loss of performance.

Initial molecular weight cutoffs of the commercially available ultrafiltration hollow fibers are generally 2,000; 10,000; 50,000 or 80,000 depending on the type of filtration desired. Coating of these fibers with a polyelectrolyte can reduce the molecular cutoffs substantially. Depending upon the composition of the coating, molecular weight cutoffs of any values may be produced, such as 150, 200, 400, 600 and 1,000 for initial 50,000-80,000 MW cutoff membranes. These low cutoffs have not previously been attainable at practical costs with membranes having a desirable flux at low pressure. Some typical hollow fiber UF membranes supplied by Romicon, Inc. have the molecular weight cutoffs and other characteristics set forth in Table A.

TABLE A
ROMICON ULTRAFILTRATION MEMBRANES

| Identifying Code Membrane | Nominal Molecular Weight Cutoff | Appatent Pore Diameter, °A | LTC Water Flux (GFSD) at 55 PSI | Hollow Fiber Water Flux (GFSD) at 25 PSI |
|---|---|---|---|---|
| UM05 | 500 | 21 | 5 | — |
| UM2 | 2,000 | 24 | 9 | — |
| AM2 (HF) | 2,000 | 24 | — | 50 |
| UM10 | 10,000 | 30 | 40 | — |
| PM5 | 5,000 | 27 | — | 70 |
| PM10 | 10,000 | 38 | 360 | 90 |
| PM30 | 30,000 | 47 | 540 | — |
| XM50 | 50,000 | 66 | 180 | 100 |
| HM | 80,000 | 90 | 180 | — |
| GM80 | 80,000 | 90 | — | 150 |
| XM100A | 100,000 | 110 | 675 | — |
| XM300 | 300,000 | 480 | 1350 | — |

The polyelectrolyte "coating" (which term is used herein to denote a substantially uniform layer bonded to an active membrane surface, such as the skin of a hollow fiber membrane or the surface of a sheet membrane may be applied by passage of a solution containing the polyelectrolyte over (or through) the membrane side to be coated. The polyelectrolyte forms as a tenacious, virtually permanent coating under ordinary operating pressures, such as those commonly used when separating substances using various types of membranes.

Polymeric cationic polyelectrolytes of relatively high molecular weight, i.e, above 100,000 and preferably above 500,000 and having water or other solvent solubility at the desired levels of application, are generally suitable as coating materials for the deionization membranes of the invention. Low molecular weight polyelectrolytes are of limited utility since they tend to penetrate the pores of the membrane. These polymeric materials are substantive to the membrane surface and are sufficiently large in MW to be rejected. Both high charge density materials and low charge density materials are useful as coating materials, but high charge density materials are preferred.

Also included within the group of polyelectrolytes which are useful by the invention are materials which can be solubilized by an organic solvent and applied as a coating therefrom. Since membrane materials are damaged by certain solvents, such as those containing the carbonoyl group, i.e., ketones and aldehydes, the solvents used for a given membrane composition should be selected carefully. In general, however, many alcohols and ethers are suitable for use with common membrane materials.

An alternative method of coating a substrate by the present invention involves forming the coating concurrently with forming the membrane substrate. Thus, a polyelectrolyte may be incorporated in the casting or spinning solution used to form the membrane, being deposited on the surface thereof as the solution permeates the membrane. The advantage of this procedure is that it eliminates the need for post-treating the membrane for ion rejection properties and can result in affixing the polyelectrolyte more permanently to the membrane surface.

For most applications, the coating solution will usually contain not more than about 2,000 parts per million (ppm) of a cationic polyelectrolyte such as poly(-vinylimidazoline), preferably not more than 500 ppm. Very minute amounts of cationic, down to a fraction of a part per million (e.g., $\frac{1}{2}$ ppm). are useful for some purposes, such as surface roughening or reducing MW cutoff. In general, however, it is preferred to apply a concentration of cationic of about 25-500 ppm.

The following table lists a number of specific polyelectrolytes, useful by the invention and refers to the abbreviations used herein to identify the same.

TABLE B

| Charge* | Abbreviation | Material |
|---|---|---|
| + | PVI | Poly(vinylimidazoline) |
| + | PEI | Poly(ethylenimine) |
| + | C32PEI | Dow's Purifloc C-32 (mainly PEI) |
| + | PADMAC | Poly)diallyldimethyl-ammonium chloride) |
| + | PVBTMA | Poly(vinylbenzyltri-methylammonium chloride) |

+ = cationic

In addition to the polyelectrolytes given above in Table B, the invention may be practiced with a wide variety of other materials. Other suitable cationic polyelectrolytes, in addition to the poly(vinylimidazoline) in the bisulfate form (PVI), include poly(4-vinylpyridine), poly(dimethylaminoethyl methacrylate), poly(t-butylaminoethyl methacrylate), poly(t-butylaminoethyl acrylate), poly(dimethylaminopropyl acrylamide), and poly(vinylamine). All of the foregoing are weak base polyelectrolytes having a pH sensitive charge. Suitable fixed charge cationic polyelectrolytes include poly(methacryloyloxyethyltrimethylammonium methyl sulfate), poly(N-methyl-4-vinylpyridinium chloride), poly(N-acrylamidopropyl-3-trimethylammonium chloride, poly(acryloxyethyldimethylsulfonium chloride), and poly(glycidyltributylphosphonium chloride).

Preparation of a coated membrane comprises passing a solution or dispersion of the coating substance over the membrane for sufficient time to cause substantial deposition of the coating substance on that surface of the membrane in contact with the solution. Normally, the coating process takes from several minutes to several hours to lay down the coating or layer. With hollow fiber membranes coating times vary between fifteen minutes and four hours, preferably thirty minutes to two hours. For optimum results, it is sometimes desirable to adjust the pH of the polyelectrolyte solution to the point where the polyelectrolyte is least ionized. Then the polyelectrolyte solution is circulated through the membrane system where it seeks deposition on the hydrophobic surface. The polyelectrolyte coating is thereafter converted slowly to the ionic form by adjusting the pH with the process fluid.

By the present invention, a membrane is normally coated on a single side, the side to be contacted by the fluid to be processed. It has also been found that polyelectrolytes may be effectively coated on the sponge side of an anisotropic hollow fiber membrane to impart substantial ion rejection properties to the membrane. The UF backflush mode of operation is used to apply the cationic polyelectrolyte to the sponge layer.

Preferably, the cationic polyelectrolyte coating or layer is PVI (in the bisulfate form) in the range of ppm or thickness, as heretofore stated. Most preferably, the PVI is coated or layered on a membrane backbone comprising a polyvinylchloride-acrylonitrile copolymer, a polysulfone or cellulose acetate and preferably the coating or layer is on the side of the membrane in direct contact with the process stream being treated. The PVI (in the sulfate form) coating or layer adheres tenaciously to the membrane material. It is essentially unique in its ability to adhere or "stick" to the membrane surface and backbone. In addition to the PVI's adherence characteristics, it gives very high flux rates, is essentially nonfouling and it preferentially rejects multivalent cations like $Ca++$, $Mg++$, etc. and therefore it is inherently good for softening water. The PVI layer tends to roughen the membrane surface causing turbulence at the membrane wall while processing a fluid and hence reducing concentration polarization. It also readily rejects + (plus) charged macromolecules or colloids. If the PVI layer does eventually become fouled or altered in some undesirable manner, it can be removed or cleared off with a solution of CHLOROX and NaOH. The PVI layer or coating is usually applied in a solution having a pH of about 11 to 12, and more preferably, about 11.5 to 12. It is usually used on waters having a pH of about 4 to 9. The only limitation known about the PVI layer is that if there are significant amounts of sulfate in the water, it will not efficiently reject $CaCl_2$.

Throughout the specification, Examples and Claims, all parts and percentages are by weight unless otherwise stated.

Another significant fact to take note of is that the uncoated membranes of this invention show zero (0%) percent $CaCl_2$ rejection. Thus, the significant multivalent rejection of cations such as $Ca++$ ions of the cationic polymeric polyelectrolyte coating or layer, thin as it may be, is particularly surprising and unexpected.

Illustrative coating procedures for membranes of different compositions and types is set forth below. The application of coatings usually employed fiber inlet pressures of 20-30 psig with a ΔP over the length of the fibers of about 5-30 psig, and with the permeate side at atmospheric pressure. Generally, after each step the system is thoroughly rinsed with deionized water.

EXAMPLE 1

In a step procedure a typical hollow fiber ultrafiltration unit (cartridge) was treated to coat the inner skin of the fibers. Various salt rejection tests were completed after each step in the coating process as a qualitative measure of coating effectiveness, and are reported in Table I below.

Step 1

A new 20 mil, 2.5 sq. ft. hollow fiber membrane cartridge having no salt rejection capacity (type GM-80 anisotropic structure, vinyl chloride/acrylonitrile copolymer, (Romicon, Inc., Woborn, Mass.) was thoroughly washed with approximately 5 liters of deionized water for one-half hour to prepare it for the coating process.

Step 2

Two liters of a 25 ppm centrifuged and millipore (0.8μ) filtered poly(vinylimidazoline bisulfate) (PVI) solution adjusted to pH 11.0 with NaOH was recirculated through the membrane for one hour. Then, deionized water was added to the process solutions at a rate equal to the rate of permeating until a pH of 8.2 for the process solution was attained.

Step 3

Two liters of a 25 ppm centrifuged and millipore (0.8μ) filtered, pH 11.2 PVI solution was recirculated for one hour.

Step 4

Two liters of a $10^{-2}$ HCl solution was circulated for 10 minutes. The the system was rinsed with deionized water until pH 7.0 was attained for both the process fluid and permeate.

Step 5

A solution of PVI prepared identical to that in Step 3 was circulated for one hour.

TABLE I

| Step No. | Salt Type | Salt Conc. ppm | *Flux GSFD | Salt Rejection (%) |
|---|---|---|---|---|
| 2 | CaCl₂ | 580 | 129 | 28 |
| 3 | CaCl₂ | 550 | 114 | 28 |
| 4 | CaCl₂ | 425 | 126 | 36 |
| 5 | CaCl₂ | 360 | 112 | 50 |

*Flux is in gallons of permeate per square foot of membrane surface area per day.

EXAMPLE 2

An anisotropic 20 mil hollow fiber UF membrane, Romicon PM-10, "hollow fiber baggie" cartridge (a small laboratory-sized cartridge comprising ten fibers potted in epoxy and contained in a plastic bag which serves as the shell of the cartridge) was coated in a stepwise manner as described below. After each coating step and each salt rejection test, the system was rinsed with deionized water. The results of this coating procedure are indicated in Table II.

Step 1

The "baggie" was rinsed for one-half hour with deionized water to prepare it for coating.

Step 2

Two liters of a 25 ppm, centrifuged and millipore (0.8μ) filtered poly(vinylimidazoline bisulfate) solution adjusted to pH 11.0 with NaOH was recirculated through the membrane for one hour.

TABLE II

| Step No. | Salt Type | Salt Conc. ppm | Pressure In psig | Pressure Out psig | pH | Flow GPM | Flux GSFD | Salt Rej. (%) |
|---|---|---|---|---|---|---|---|---|
| 1 | $H_2O$ | — | 30 | 0 | — | 0.90 | 102 | — |
| 2 | $CaCl_2$ | 372 | 30 | 0 | 7.0 | 0.90 | 38 | 83 |

EXAMPLE 3

A Biofiber 80 (T. M. of Dow Chemical Company) cellulose acetate HF membrane "Minibeaker" system was coated in a stepwise manner as described below. After each coating step and each salt rejection test, the system was thoroughly rinsed with deionized water.

Step 1

The system was rinsed for one hour with deionized water to prepare it for coating.

Step 2

Two liters of a 100 ppm, pH 8.95 PVI solution were recirculated through the membrane for two hours.

Step 3

Two liters of a 100 ppm, pH 10.5 PVI solution were recirculated through the system for two hours.

Divalent cationic ions were found to be rejected by the membrane of Example 3 following Step 3.

EXAMPLES 4–6

Following the procedures described in the foregoing examples, principally Example 1, Romicon XM-50 ("hollow fiber baggie") UF filters were coated with various concentrations of PVI to determine the effect of concentration on divalent ion rejection. Salt rejection tests were conducted with $CaCl_2$ to show the effect of rejection of divalent cations.

TABLE III
(Example 4)

| Coating Steps | Treating Solution (DI $H_2O$)* | Time of Treatment Hours | Post treatment membrane tests Salt Type | Conc. ppm | Salt rej. % |
|---|---|---|---|---|---|
| 1 | 25 ppm PVI | 3.0 (dialysis mode)** | $CaCl_2$ | 610 | 57 |

*Deionized Water
**Make-up DI $H_2O$ added to concentrate to maintain constant volume of solution.

TABLE IV
(Example 5)

| Coating Steps | Treating Solution (DI $H_2O$) | Time of Treatment Hours | Post treatment Membrane Tests Type | Salt Conc. | Rej. % |
|---|---|---|---|---|---|
| 1 | 25 ppm PVI | 1.5 | $CaCl_2$ | 295 | 29 |
| 2 | HCl* | 1.5 | $CaCl_2$ | 295 | 43 |
| 3 | 25 ppm PVI | 1.5 | $CaCl_2$ | 310 | 85 |

*Used to protonate the PVI electrolyte.

TABLE V
(Example 6)

| Coating Steps | Treating Solution (DI $H_2O$) | Time of Treatment Hours | Post Treatment Membrane Tests Type | Salt Conc. | Rej. % |
|---|---|---|---|---|---|
| 1 | 50 ppm PVI | 1.5 | $CaCl_2$ | 360 | 62 |
| 2 | 50 ppm PVI | 1.5 | $CaCl_2$ | 275 | 82 |
| 3 | 50 ppm PVI | 1.5 | $CaCl_2$ | 410 | 76 |

What is claimed is:

1. A cation-rejecting membrane comprising a semipermeable membrane substrate having affixed thereto a thin coating or layer of a polymeric cationic polyelectrolyte and said coating or layer being substantive to the surface of the polymeric membrane substrate under ordinary membrane filtration conditions, said polymeric cationic polyelectrolyte being poly(vinylimidazoline) in the bisulfate form.

2. A cation-rejecting membrane according to claim 1 wherein the membrane substrate is selected from the group consisting of polyimide, polysulfone, styrene-acrylonitrile, copolymers of polyvinylchloride with acrylonitrile, cellulose acetate, acrylonitrile, polycarbonates, polyvinyl chloride, copolymers of polyvinyl chloride with a modacrylic polymer, polyamide/imide, aliphatic and aromatic nylons, polyamide, polyacrylonitrile and polyphenyleneoxide, said polymeric cationic polyelectrolyte being poly(vinylimidzoline) in the bisulfate form.

3. A cation-rejecting membrane according to claim 2 wherein the membrane is comprised of polysulfone or a copolymer of polyvinylchloride with acrylonitrile or cellulose acetate, said polymeric cationic polyelectrolyte being poly(vinylimidazoline) in the bisulfate form.

4. A cation-rejecting membrane according to claim 3 wherein the polymeric cationic polyelectrolyte is poly(vinylimidazoline) in the bisulfate form.

5. A method according to claim 3 wherein the rejected material is $CaCl_2$.

6. The ion-rejecting polymeric membrane of claim 1 wherein the polymeric substrate is a hollow fiber membrane.

7. The ion-rejecting polymeric membrane of claim 1 wherein the polymer substrate is a linear thin channel membrane.

8. The ion-rejecting polymeric membrane of claim 1 wherein the polymeric membrane substrate is an anisotropic hollow fiber ultrafiltration membrane.

9. The ion-rejecting polymeric membrane of claim 1 wherein the polymeric substrate is a hollowfiber reverse osmosis membrane.

10. The ion-rejecting polymeric membrane of claim 1 wherein the polymeric substate is a flat sheet membrane.

11. The ion-rejecting polymeric membrane of claim 1 wherein the polymeric membrane substrate is a sheet membrane.

12. A method of ion-rejecting a solution containing solubilized ionic materials which comprises passing said solution over an ion-rejecting membrane comprising a semipermeable membrane substrate having affixed thereto a thin coating or layer of a polymeric cationic polyelectrolyte, said polymeric cationic polyelectrolyte being poly(vinylimidazoline) in the busulfate form.

13. A method according to claim 12 wherein the rejected component is a positively charged ion or a positively charged macromolecule or colloid.

14. A method according to claim 13 wherein the solution is an aqueous solution.

15. A method according to claim 13 wherein the polymeric membrane substrate is a hollow fiber membrane.

16. A process for preparing an ion-rejecting membrane which comprises sequentially recirculating dilute solutions of substantive relatively high molecular weight polymers of a cationic polymeric polyelectrolyte over a porous membrane substrate to affix the cationic polymeric polyelectrolyte to the membrane substrate as a discrete coating or layer, said polymeric cationic polyelectrolyte being poly(vinylimidazoline) in the bisulfate form.

* * * * *